United States Patent [19]
Matsueda et al.

[11] Patent Number: 6,037,915
[45] Date of Patent: *Mar. 14, 2000

[54] OPTICAL REPRODUCING SYSTEM FOR MULTIMEDIA INFORMATION

[75] Inventors: Akira Matsueda, Tachikawa; Shinichi Imade, Iruma; Hiroyoshi Fujimori, Hachioji, all of Japan

[73] Assignee: Olympus Optical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/607,470

[22] Filed: Feb. 27, 1996

[30] Foreign Application Priority Data

Mar. 1, 1995 [JP] Japan .................... 7-041942

[51] Int. Cl.[7] .................................................. G09G 5/00
[52] U.S. Cl. ................... 345/8; 345/302; 235/462
[58] Field of Search ................... 345/7.8, 179, 182, 345/183, 115, 328, 302; 348/52, 53; 235/462, 472; 359/480, 481, 630, 632; 178/18, 19, 18.01, 18.09, 19.01; 396/315

[56] References Cited

U.S. PATENT DOCUMENTS

| | | | |
|---|---|---|---|
| 5,021,640 | 6/1991 | Muroi | 345/173 |
| 5,380,994 | 1/1995 | Ray | 235/472 |
| 5,480,306 | 1/1996 | Liu | 434/156 |
| 5,491,510 | 2/1996 | Gove | 345/8 |
| 5,528,263 | 6/1996 | Platzker et al. | 345/179 |
| 5,644,557 | 7/1997 | Akamine et al. | 396/315 |
| 5,652,412 | 7/1997 | Lazzouri et al. | 345/179 |
| 5,659,327 | 8/1997 | Furness, III et al. | 345/8 |
| 5,729,252 | 3/1998 | Fraser | 345/328 |
| 5,748,173 | 5/1998 | Gur | 345/115 |
| 5,896,403 | 4/1999 | Nagasaki et al. | 369/14 |

FOREIGN PATENT DOCUMENTS

| | | |
|---|---|---|
| 39 38 515 A1 | 5/1991 | Germany . |
| 406139394 | 5/1994 | Japan ................... G06K 7/10 |
| WO 87/06752 | 11/1987 | WIPO . |
| WO 94/08314 | 4/1994 | WIPO . |

*Primary Examiner*—Lun-Yi Lao
*Attorney, Agent, or Firm*—Frishauf, Holtz, Goodman, Langer & Chick, P.C.

[57] ABSTRACT

To minimize shifting of the line of sight of an operator and accomplish proper association of a medium surface and a display screen with each other to ensure data presentation with standardized media, an information reproducing system includes a code book in which code information with respect to multimedia information including at least voices and images is recorded, a reading section for reading codes recorded in the code book. A processing section is provided for processing and outputting data read by the reading section is provided and a face mounted display is provided for outputting at least voices and images based on the processed data output by the processing section. The face mounted display forms at least a real image or an imaginary image of the output image at a position of a predetermined distance on the same line of sight.

6 Claims, 6 Drawing Sheets

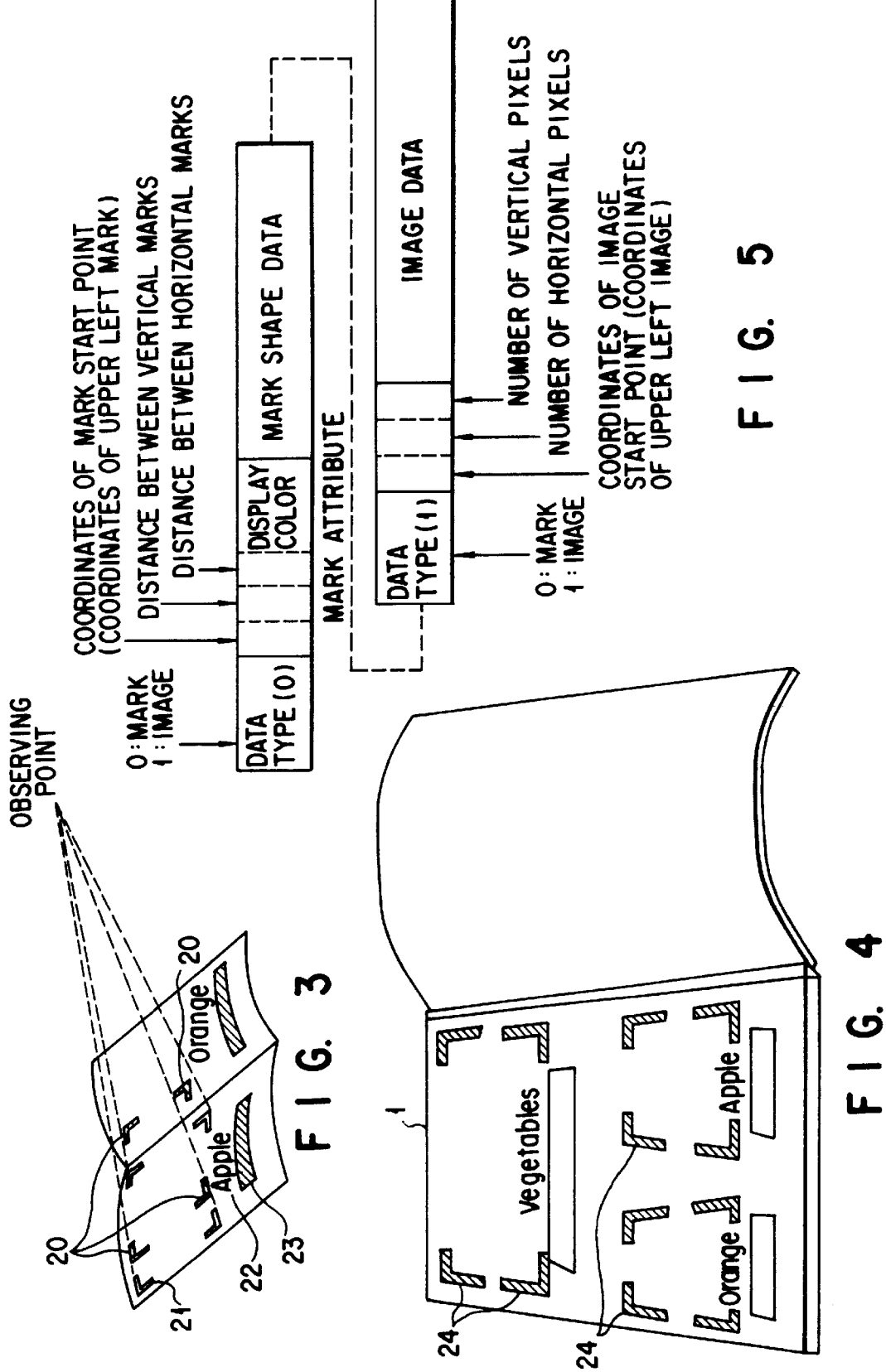

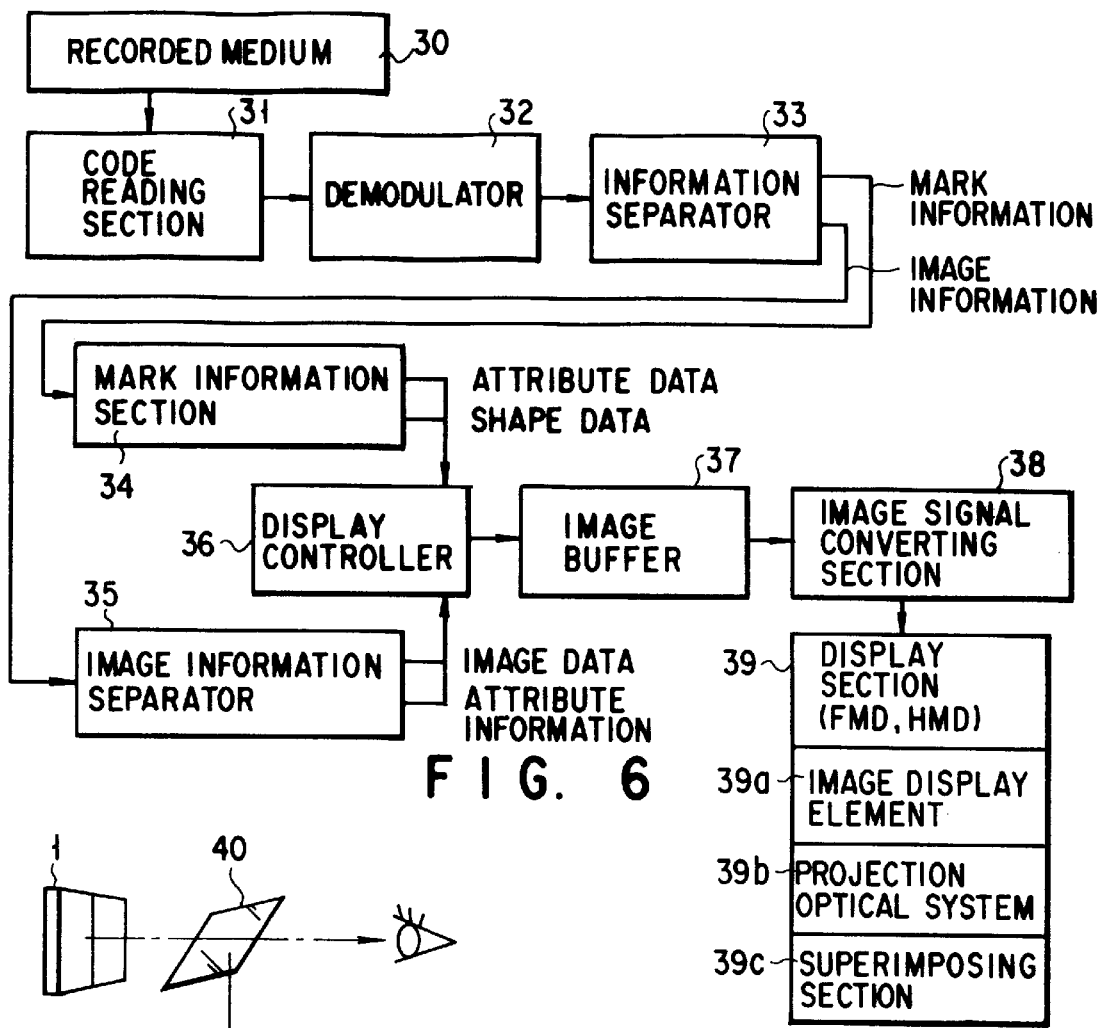
F I G. 6
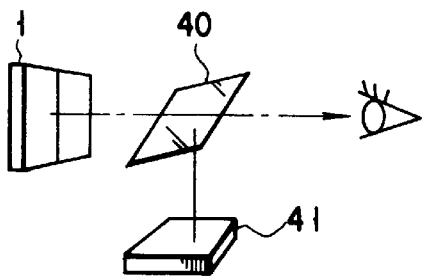
F I G. 7
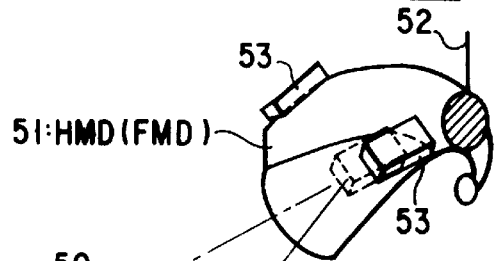
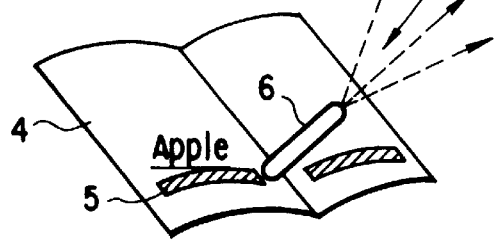
F I G. 8

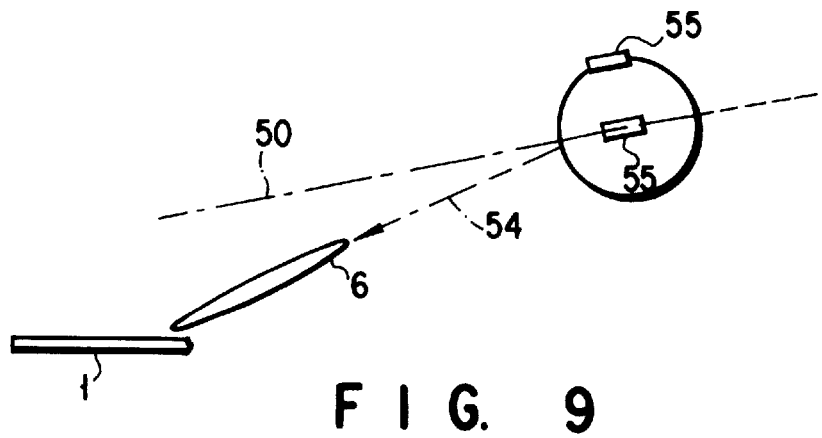
F I G. 9
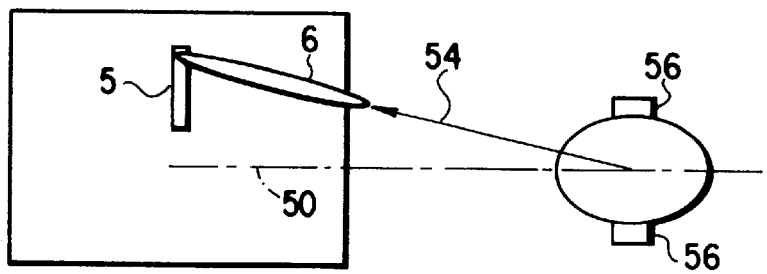
F I G. 10
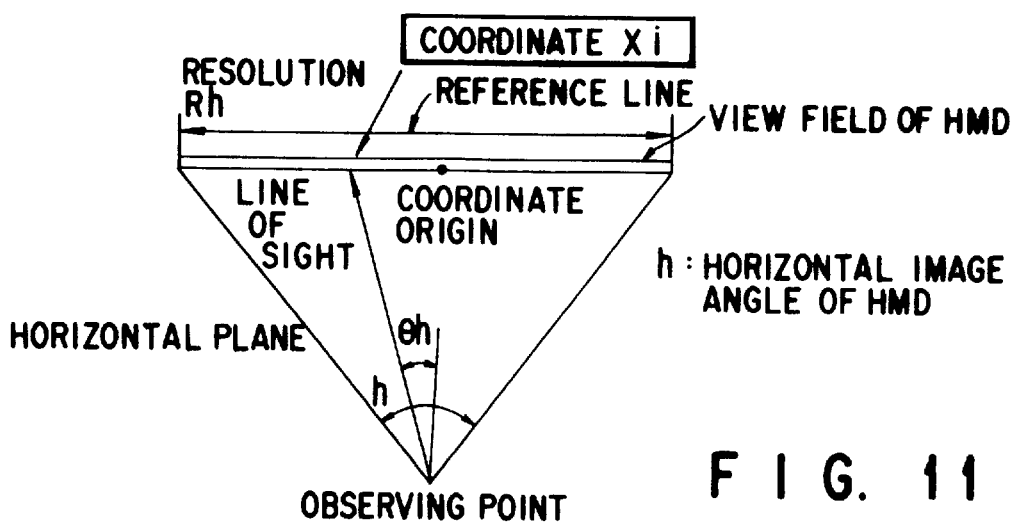
F I G. 11
$$Xi = \frac{\theta h}{h} \times Rh$$

CONSTANT 1 : Rh, Rv, θh, θv
CONSTANT 2 : lh, lb

OPTICAL REPRODUCING SYSTEM FOR MULTIMEDIA INFORMATION

Background of the Invention

1. Field of the Invention

The present invention relates to an information reproducing system information reproducing system, and, more particularly, to an information reproducing system which reads codes associated with so-called "multimedia information" including image data obtained from a camera, a video machine or the like, and digital code data obtained from a personal computer, a word processor or the like, and which reproduces such information.

2. Description of the Related Art

Today, people are demanding the development of a system which can record multimedia information including images, voices and the like, on a sheet of paper with limited space at a high density, and which can reproduce this information to allow users to generally use the images, voices and so forth for educational purposes.

For example, International Patent Application No. PCT/JP93/01377 (WO/94/08314, U.S. Ser. No. 08/407,018) filed by the assignee of this application discloses a technique for recording multimedia information on paper, a sheet or a film in the form of dot codes, and for reproducing the information therefrom. This technology enables recording and reproducing of electronic images, voices, etc. via paper or the like, and the display of images on the screen of a CRT.

Paper as an intervening medium is originally capable of showing images. If the system is designed in such a way as to acquire images to be displayed on the CRT by reproducing code information from paper on which codes and images, such as pictures or illustrations, are recorded, an operator should see two display screens or the reproduced images on the paper and the CRT. This requires shifting of the line of sight which is undesirable from the viewpoint of user-friendly presentation of information to users.

If two media such as paper and a CRT are not properly associated with each other, some improvement should still be needed to accomplish information presentation by the cooperative use of both media.

SUMMARY OF THE INVENTION

It is therefore an object of the present invention to provide a new and improved information reproducing system which can minimize the shifting of the line of sight of an operator and accomplish the proper association of the medium surface and the display screen with each other to ensure data presentation with standardized media.

According to a first aspect of the present invention, there is provided an information reproducing system comprising: a recording medium for providing multimedia information including at least image information is recorded with optically readable codes, therein; reading means for reading code information recorded in the recording medium; processing means for processing the code information read by the reading means; and outputting means for outputting image data based on the code information processed by the processing means, and creating an output image at a predetermined position between eyeballs of an observer and the recording medium.

According to a second aspect of the present invention, there is provided an information reproducing system which comprises reading means for optically reading optically readable codes from a recording medium including a portion where multimedia information including at least image information is recorded in optically readable codes, a real image associated with the codes being freely recordable on the recording medium; processing means for processing the codes read by the reading means and outputting predetermined data; output means for outputting the data processed by the processing means as original multimedia information; and image synthesizing means for optically synthesizing a display image output by the output means and an image on a surface of the recording medium.

According to a third aspect of the present invention, there is provided an information recording medium which comprises a portion where multimedia information including at least image information is recorded in optically readable codes, a real image associated with the codes being freely recordable on a recording medium, and a positioning index for optically synthesizing a display image based on the image information and the real image or a predetermined position on the recording medium.

According to a fourth aspect of the present invention, there is provided an information reproducing system to be adapted for a recording medium including a portion where multimedia information including at least image information is recorded in optically readable codes, a real image associated with the codes being freely recordable on the recording medium, which system comprises reading means for optically reading the codes; processing means for processing the codes read by the reading means and outputting predetermined data; and output means for outputting the data processed by the processing means as original multimedia information, the output means comprising a head mounted display having an image display element for displaying input image data, a projection optical system for projecting an image, displayed on the image display element, onto eyeballs of an observer, and superimposing means for superimposing a surface of the recording medium as an outer image to be led to the eyeballs of the observer and an image based on the read codes in an observable form, the recording medium having a positioning index for determining a position of an imaginary image of an image to be projected on the eyeballs of the observer by the projection optical system, the codes including a positioning mark to be associated with the positioning index.

In the information reproducing system according to the first aspect of this invention, reading means optically reads optically readable codes from a recording medium, which provides multimedia information including at least image information is recorded in optically readable codes, therein, processing means processes the code information read by the reading means, and output means outputs image data based on the code information processed by the processing means. In the output means, an output image is created at a predetermined position between eyeballs of an observer and the recording medium.

In the information reproducing system according to the second aspect of this invention, reading means optically reads optically readable codes from a recording medium, which includes a portion where multimedia information including at least image information is recorded in optically readable codes and can freely record a real image associated with the codes, processing means processes the codes read by the reading means and outputs predetermined data, output means outputs the data processed by the processing means as original multimedia information, and image synthesizing means optically synthesizes a display image output by the output means and an image on the surface of the recording medium.

An information recording medium according to the third aspect of this invention has a positioning index for optically synthesizing a display image based on image information and the real image or a predetermined position on the recording medium.

In the information reproducing system according to the fourth aspect of this invention, reading means optically reads the codes, processing means processes the codes read by the reading means and outputs predetermined data, and output means outputs the data processed by the processing means as original multimedia information. The output means comprises a head mounted display having an image display element for displaying input image data, a projection optical system for projecting an image, displayed on the image display element, onto the eyeballs of an observer, and superimposing means for superimposing the surface of the recording medium as an outer image to be led to the eyeballs of the observer and an image based on the read codes in an observable form. The recording medium is further provided with a positioning index for determining a position of an imaginary image of an image to be projected on the eyeballs of the observer by the projection optical system, and the codes include a positioning mark to be associated with the positioning index.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a diagram for explaining a process of positioning a mark 20 to an index 21 in a third embodiment;

FIG. 4 is a diagram illustrating a code book 1 showing a plurality of defined indices;

FIG. 5 is a diagram showing the file structure of a code shown on the code book 1;

FIG. 6 is a diagram showing the structure of a processing circuit in the information reproducing system;

FIG. 7 is a diagram showing the structure of an information reproducing system according to a fourth embodiment;

FIG. 8 is a diagram showing the structure of an information reproducing system according to a fifth embodiment;

FIG. 9 is a diagram showing the up and down positional relationship between the code book 1 and a head mounted display (HMD) 51;

FIG. 10 is a diagram showing the right and left positional relationship between the code book 1 and the HMD 51;

FIG. 11 is a diagram for explaining how to compute the point of intersection between the direction of the line of sight and an imaginary image on the HMD or the coordinates on the display area of the HMD;

DETAILED DESCRIPTION OF THE PREFERRED EMBODIMENTS

Figure 1A:
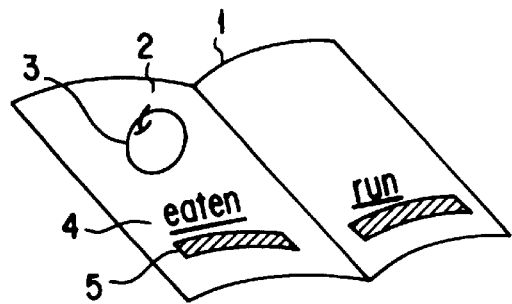
FIGS. 1A and 1B are diagrams showing the structure of an information reproducing system according to a first embodiment of this invention.

Reference will now be made in detail to the presently preferred embodiments of the invention as illustrated in the accompanying drawings, in which like reference characters designate like or corresponding parts throughout the several drawings.

The preferred embodiments of this invention will now be described with reference to the accompanying drawings.

Figure 1B:
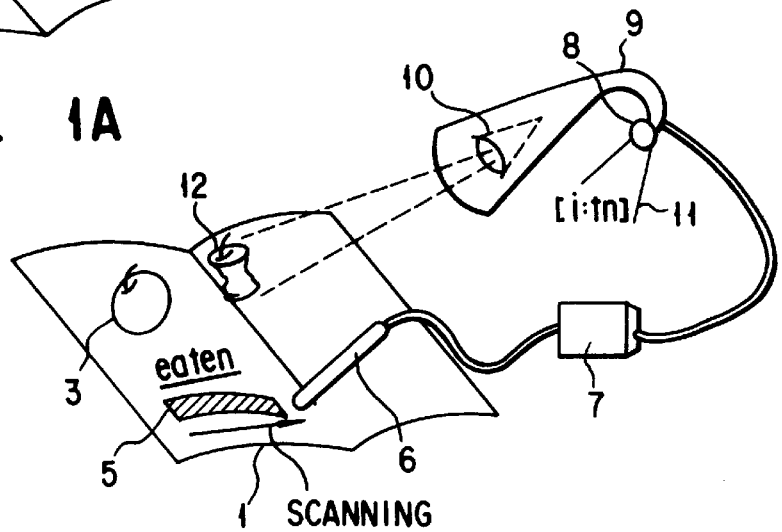

FIGS. 1A and 1B show the structure of an information reproducing system according to the first embodiment of this invention.

As shown in FIG. 1A, a printed illustration 3 and paper printed characters 4 as a real image, and an optically readable code 5 are recorded on the medium surface, 2, of a code book 1. In this example, the picture of an apple is given as the printed illustration 3, below which "eaten" is written as the printed characters 4 associated with the printed illustration 3, and multimedia information associated with the illustration 3 and characters 4 is depicted in a code like a dot code or the like. As this dot code is disclosed in the aforementioned International Patent Application No. PCT/JP93/01377 (WO/94/08314, U.S. Ser. No. 08/407, 018), its detailed description will not be given.

Figure 17A:
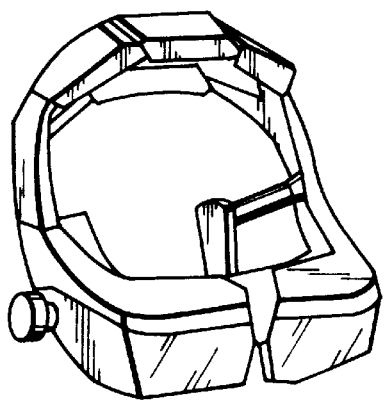
FIGS. 17A and 17B are perspective views of the HMD.
Figure 17B:

In actually using such a code book 1, as shown in FIG. 1B, an operator puts a face mounted display (FMD) 9 on the face and a reading section 6 connected via a processing section 7 to the FMD 9 scans the code 5 recorded on the code book 1 to acquire read information. This FMD 9 has an appearance as shown in FIG. 17A, and is to be placed on the face of the operator when in use as shown in FIG. 17B. The FMD 9 may of course be replaced with a head mounted display (HMD).

The code information obtained by scanning by the reading section 6 is processed by the processing section 7 and is then sent to the FMD 9. At this time, eyes 10 of the operator are directed on the entire code book 1 via the FMD 9. When an image associated with the code information is projected on the eyes of the operator, the operator recognizes as if the picture of an eaten apple is displayed at a predetermined position on the code book 1, and at the same time, the aforementioned characters "eaten" are output in voice from a small loudspeaker 8.

Although the operator sees the picture of an apple or the printed illustration 3 at first, the operator recognizes the picture of an eaten apple by the printed illustration 3 through the above-described operation. The operator can therefore see the new picture simply by focusing the eyes on it. This display may be presented on a separate CRT located nearby, in which case the operator should considerably move the line of sight and the face to see the new picture, making it difficult to compare those two pictures with each other. To overcome this shortcoming, the FMD 9 projects a reproduced image on human eyes in such a way as to be associated with a predetermined position at a short distance from the medium surface in this invention.

According to the first embodiment, as discussed above, an operator who has been watching the picture of an apple simultaneously recognizes the voice of "eaten" and the picture of an eaten apple, both associated with an uneaten apple or the printed illustration 3, through the above-described operation. Therefore, the operator can recognize the correlation between the printed illustration 3, the voice and the projected picture, thus ensuring easy and efficient learning. In particular, the relation between the two pictures is presented within the same field of view, the presentation can be very persuasive.

Figure 2A:
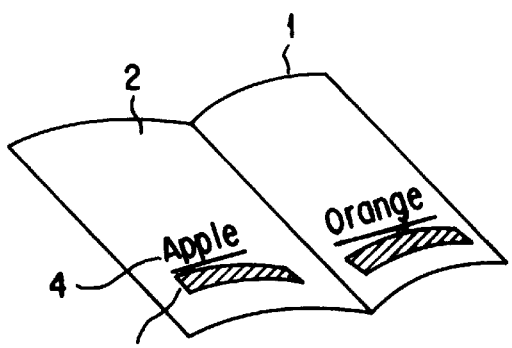
FIGS. 2A and 2B are diagrams showing the structure of an information reproducing system according to a second embodiment of this invention.
Figure 2B:
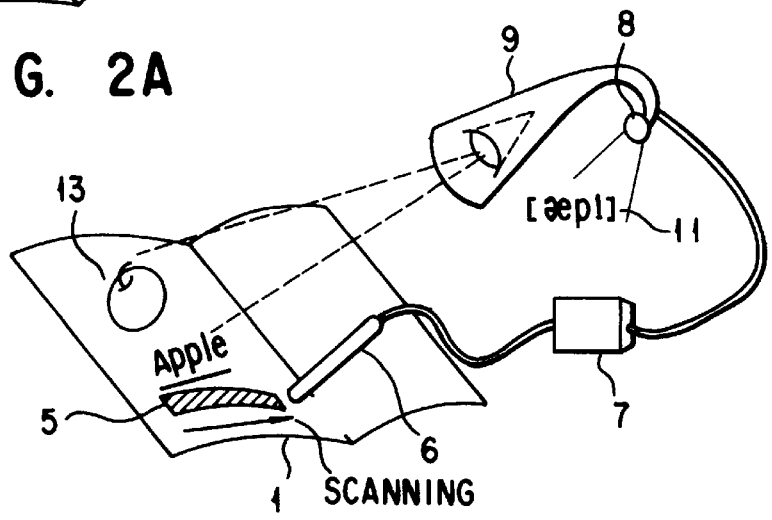

FIGS. 2A and 2B show the structure of an information reproducing system according to the second embodiment of this invention.

As shown in FIG. 2A, paper printed characters 4 and a code 5 are recorded on the medium surface, 2, of a code book 1. In this example, "Apple," for example, is given as the printed characters 4 below which multimedia information associated with the characters 4 is described in the code 5 like a dot code or the like.

In actually using such a code book 1, as shown in FIG. 2B, an operator puts an FMD 9 on the face and a reading section 6 connected via a processing section 7 to the FMD 9 scans the code 5. The information obtained by this scanning is processed by the processing section 7 and is then sent to the FMD 9. At this time, eyes 10 of the operator are directed on the entire code book 1 via the FMD 9. When the information is reproduced, an image is projected on the eyes 10 of the operator so that the operator recognizes as if the picture of an apple is displayed at a predetermined position on the code book 1, and at the same time, the aforementioned characters "Apple" are output in voice from a small loudspeaker 8.

According to the second embodiment, as discussed above, an operator can simultaneously recognize the picture of an apple illustrated in the blank portion on the code book 1 and the voice of "Apple," through the above-described operation. From the correlation between the picture and voice, therefore, the operator can learn the material. Further, the observed position of the imaginary image is in a midway between the medium surface and the line of sight of the operator according to the first embodiment, whereas an image is displayed as if it is on the medium surface in the second embodiment. Furthermore, while the display position of this image is previously set on the code book, it can be set arbitrarily.

According to the information reproducing systems of the first and second embodiments, an operator performs an operation to read a code and reproduce multimedia information associated with this code, the FMD 9 displays an associated picture at the predetermined position on the code book 1. When the line of sight of the operator is off the code book 1, however, the picture may not be recognized on the code book 1, inconvenience the operator. In this respect, the third embodiment is designed to display a mark for positioning to the code book 1 on the display screen of the FMD 9.

An information reproducing system according to the third embodiment will now be explained with reference to FIGS. 3 through 6.

As shown in FIG. 3, four indices 21 are previously printed at predetermined positions on the medium surface of a code book 1 in the third embodiment. When an operator reads a code 23 recorded on the code book 1, four marks 20 corresponding to the indices 21 are projected on the eyes of the operator so that the operator recognizes as if those marks 20 are displayed on the code book 1. As the operator moves the face to overlap the marks 20 on the indices 21, therefore, the image display position on the code book 1 can easily be set.

As shown in FIG. 4, the information reproducing system of the third embodiment can also show a plurality of defined indices 24. The code 23 includes mark information so that when the code 23 is read, the marks 20 are displayed on the medium surface on the code book 1 as indicated in FIG. 3. The display range for the image can therefore be clearly indicated by matching the indices 24 with the marks 20. Further, a plurality of finer displays may be presented in one screen.

A description will now be given of the file structure in FIG. 5 which is associated with the code 23.

As shown in FIG. 5, a file associated with this code 23 essentially consists of data for marks and data for displaying an image. Data indicative of the data type described at the head part of each data: "0" to indicate data for the marks and "1", to indicate data for displaying an image. In the illustrated example, "0" is recorded at the head part of the data for the marks. Following the data type are attribute data such as the coordinates of the mark start point (the coordinates of the upper left mark), the distance between marks in the vertical direction, the distance between marks in the horizontal direction and the display color, and mark shape data.

With regard to the data for displaying an image, "1" indicative of an image as the data type is recorded first, and then attribute data, such as the coordinates of the mark end point (the coordinates of the upper left image, the number of horizontal pixels and the number of vertical pixels, is then recorded. Following the attribute data is the actual image data.

FIG. 6 shows the structure of a processing circuit in the information reproducing system for reading and processing the information of such a code 23.

In FIG. 6, a recording medium 30 is equivalent to the aforementioned code book 1 and it is where information about the marks 20 for positioning an image to be displayed by the FMD 9. The code 23 on this recording medium 30 is read by a code reading section 31. A demodulator 32 performs demodulation (de-interleaving, ECC (Error Correction Coding), and expansion of image data) on the read block to finally acquire auxiliary information for displaying the marks 20 (display position, shape, color, etc.), auxiliary information for displaying an image (display position, time from the marker display to the image display, etc.), and image data. An information separator 33 separates the demodulated data to data associated with the marks and data associated with the image, and outputs those data separately.

Subsequently, a mark information separator 34 separates mark attribute data (coordinates, color, etc.) and mark shape data from the input mark information, and selectively outputs those data to a display controller 36. Likewise, an image data separator 35 separates image attribute data (coordinates, color, etc.) and image data from the input image information, and selectively outputs those data to the display controller 36. Then, the display controller 36 writes data in an image buffer 37 or read data therefrom in synchronism with the timing of a video signal for displaying the contents. At the time of writing data, the display controller 36 separately receives the attribute data and image data (shape data) from the information separator 33.

The image buffer 37 is a bit image buffer corresponding to the display screen. For color images, the image buffer 37 may be constituted by an RGB plane. An image signal converting section 38 performs D/A conversion of data read from the image buffer 37 and affixes a sync signal to the resultant data to yield an image signal. The contents of the image buffer 37 are read out in synchronism with the display timing. If the data from the image buffer 37 is output in the form of a color composite signal, this data is converted to a specific signal (NTSC signal or the like).

A display section 39 receives an image signal from the FMD, HMD or the like and displays data in a superimpose mode. The display section 39 comprises a liquid crystal display (LCD) as an image display element 39$a$, a projection optical system 39$b$ and a superimpose section 39$c$, which are all known.

The above-described information reproducing systems according to the first to third embodiments use an FMD or HMD and superimpose an image projected on the eyes of an observer on what is on the medium surface by using the superimpose function. The same advantage is obtained by properly using an optical system as done in the fourth embodiment.

The structure of an information reproducing system according to the fourth embodiment will be discussed below with reference to FIG. 7.

In this fourth embodiment, a display image and an image on a code book 1 are optically combined as if both images are integrated. More specifically, the medium surface of the code book 1 is led to the observer's eyes via a half mirror 40 and an image on an LCD panel 41 is reflected by the half mirror 40 so that this image is superimposed on the medium surface on the observer's eyes. A prism may be used instead of the half mirror.

The fourth embodiment can provide the effect of pseudo integration of two images with a simple structure, and contributes to reducing the manufacturing cost as compared with the case where an FMD or the like is used. The fourth embodiment can improve the learning effect with the simple structure.

The structure of an information reproducing system according to the fifth embodiment will be discussed in detail below with reference to FIGS. 8 through 16.

While the second embodiment requires that an operator should move the face to overlap the indices on the marks to display an image at a predetermined position on the code book, the fifth embodiment can permit wireless communication between a reading section 6 and an HMD 51, can recognize the position of the reading section 6 as the position to which the line of sight of the operator is directed, and can automatically set the position to display the image by a predetermined computation which will be discussed below. The emission section may also serve as wireless data communication means.

As shown in FIG. 8, the reading section 6 has an unillustrated emission section for emitting a radio wave or the like, and the HMD 51 is provided with a data reception unit 52 for receiving code information from the reading section 6 and an emission source detecting unit 53 for detecting the position of the emission section of the reading section 6. Further, the emission source detecting unit 53 has a detecting element which may be a position sensing device.

This detecting element outputs the position (address) of the cell among a two-dimensional array of receiving cells which detects the maximum amount. The HMD 51 with this structure detects the position of the reading section 6 by means of the detecting element of the emission detecting unit 53, and recognizes this position as the position to which the observer's line of sight is directed to thereby specify the position for the image display by a predetermined computation discussed below.

The detection of the position of the line of sight and the detection of the reading section 6 are executed separately for the horizontal plane and the vertical plane. More particularly, the vertical angle defined by a reference line indicative of the direction of the line of sight when the HMD 51 faces frontward and the line connecting the reading section and the HMD 51 is detected from the output of a vertical direction detecting unit 55, as shown in FIG. 9. Likewise, the horizontal angle defined by the reference line and the line connecting the reading section and the HMD 51 is detected from the output of a horizontal direction detecting unit 56, as shown in FIG. 10.

Figure 13:
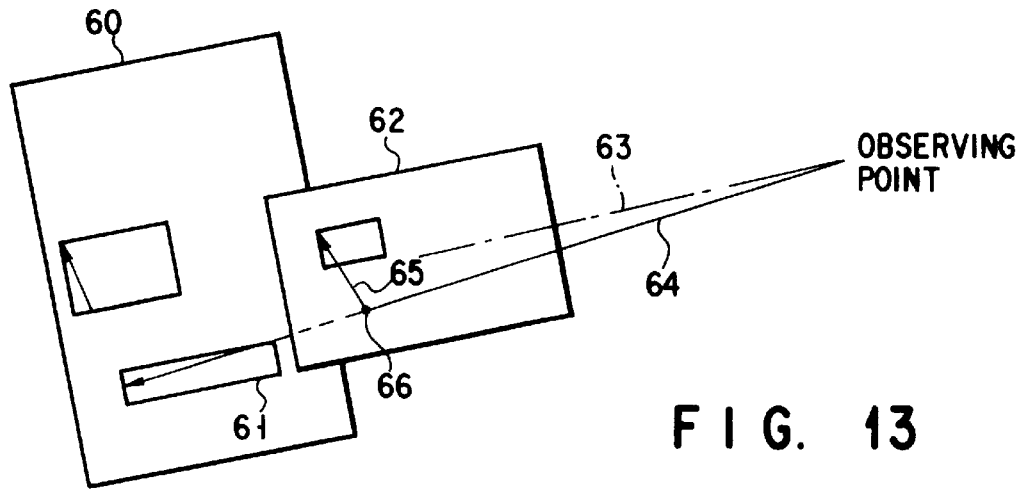
FIG. 13 is a diagram showing the relationship between the field of view of the HMD and a medium like a code book.

FIG. 13 shows the relationship between the field of view of the HMD and the medium (code book 1).

If the position detection is executed at, for example, the scan start point, the left-end position of the code and the position on the associated display screen are known. That is, a point on the display screen has been associated with a point on the medium. When it is detected by the actions of the HMD 51 and the reading section 6 that the observer's line of sight is inclined to a reference line 63 by a predetermined angle, it is necessary to acquire the coordinates (xi, yi) of the intersection 66 of the line of sight and the HMD view field to display an image at the proper position.

A method of computing the coordinates (xi, yi) of the intersection of the direction of the line of sight and the imaginary image surface of the HMD will now be described with reference to FIGS. 11 and 12. FIG. 11 shows the angle of the line of sight to the horizontal HMD view field and FIG. 12 shows the angle of the line of sight to the vertical HMD view field.

In FIG. 11, h is the horizontal directional image angle of the HMD 51 and Rh is the predetermined resolution of the HMD with respect to this angle. If the direction of the line of sight forms an angle θh with respect to the reference line, the coordinate xi of the horizontal position or the position of the line of sight from the coordinate origin is Rh×h/θh on the left of the center of the screen.

Figure 12:
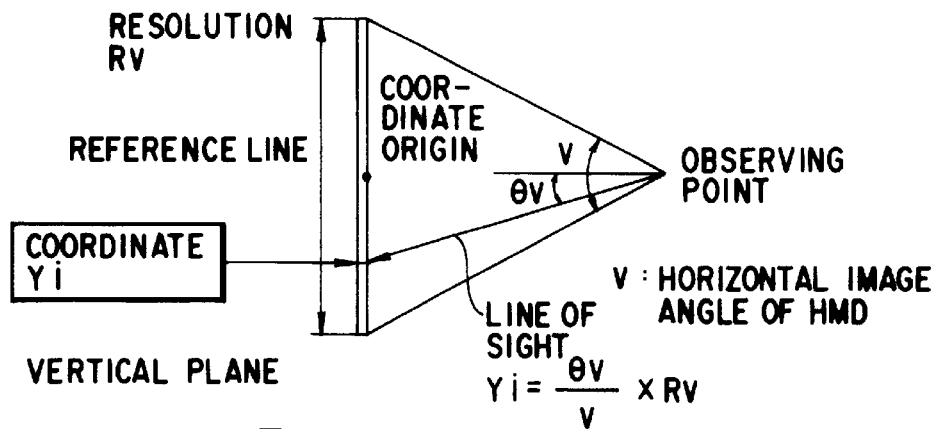
FIG. 12 is a diagram for explaining how to compute the point of intersection between the direction of the line of sight and an imaginary image on the HMD or the coordinates on the display area of the HMD.

In FIG. 12, likewise, v is the vertical directional image angle of the HMD 51 and Rv is the predetermined resolution of the HMD with respect to this angle. If the direction of the line of sight forms an angle θv with respect to the reference line, the coordinate yi of the vertical position or the position of the line of sight from the coordinate origin is Rv×v/θv on the left of the center of the screen. In this manner, the coordinates (xi, yi) of the intersection of the line of sight and the HMD view field are acquired.

Assuming that an image is to be displayed at a position apart from the code reading position by a predetermined amount of offset as sown in FIG. 13, it is necessary to obtain the amount of offset on the HMD view field corresponding to the predetermined offset amount.

Figure 14:
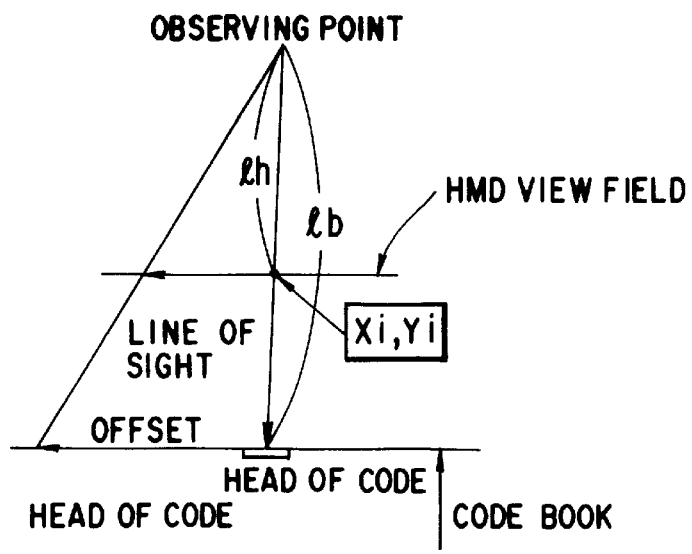
FIG. 14 is a diagram illustrating how to compute the amount of offset on the HMD view field from the amount of offset on the code book.

The offset amount from the code to a reference point (e.g., the upper left position) in the display range on the medium surface is pre-recorded in the code as the display specification. This value therefore has only to be converted to a value on the HMD view field. That is, as shown in FIG. 14, as the ratio of the distance lh from the observing point to the intersection (xi, yi) on the HMD view field to the distance lb from the observing point to the distal end position of the code is equal to the ratio of the amount of offset on the HMD view field to the amount of offset on the medium surface, the amount of offset on the HMD view field can be acquired from this relation.

Although it is assumed in this computation that the positional relationship between the observing point and the display screen of the HMD is constant, regardless of operators, this would not raise a significant problem if an image should be displayed with a certain positional error. The position obtained by adding the converted offset amount to the intersection (xi, yi) of the line of sight and the screen is the display start point.

A description will now be given of the structure which accomplishes the above-described computation of the display start point and the actual display, with reference to FIGS. 15 and 16.

Figure 15:
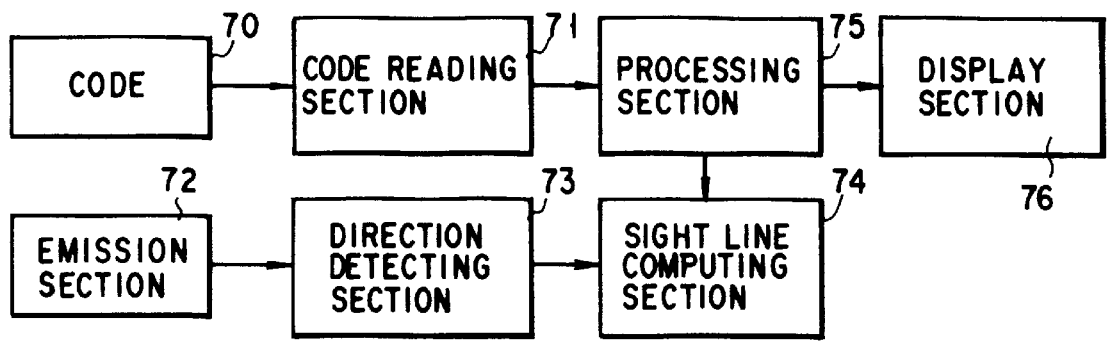
FIG. 15 is a diagram showing a structure which actually executes the computations illustrated in FIGS. 11 through 13.

As shown in FIG. 15, a code 70 like a dot code is read by a code reading section 71 and this information is output to a processing section 75. A signal or light emitted from an emission section 72 is detected by a direction detecting section 73, the direction of the line of sight is detected by a sight line computing section 74, and this information is output to the processing section 75. The processing section 75 outputs information to a display section 76.

Figure 16:
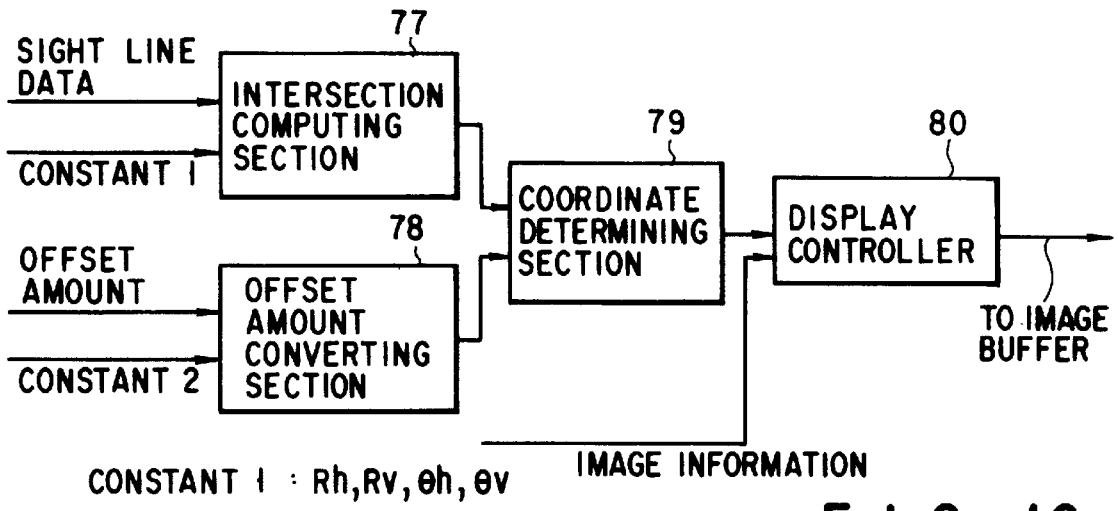
FIG. 16 is a diagram showing the detailed description of a processing section 75 in FIG. 15.

The detailed structure of the processing section 75 is shown in FIG. 16. That is, the processing section 75 comprises a computing section 77 for computing the intersection of the line of sight and the field of view, an offset amount converting section 78, a coordinate determining section 79 and a display controller 80. Sight line data and constants (Rh, Rv, h, v) are input to the intersection computing section 77 which computes the intersection between the line of sight and the field of view. An offset amount and constants (lh, lb) are input to the offset amount converting section 78 for the computation of the offset amount. The computed intersection and offset amount are sent to the coordinate determining section 79. The coordinates of the position on the HMD view field where an image is to be displayed are computed through the above-described sequence of computations, and are then output the display controller 80.

In short, the information reproducing system of the fifth embodiment automatically executes the simple and fast position setting without requiring a predetermined operation by the operator at the time the image display position on the HMD is set.

As specifically described above, the information reproducing systems of this invention use an FMD or the like to reproduce an image in the same direction of the line of sight to the medium surface as viewed from the operator, thus minimizing the shifting of the line of sight. Further, as the display screen is associated with the medium surface, their cooperative use can ensure persuasive information presentation.

The following structures can be realized by the above-described embodiments of this invention.

(1) An information reproducing system comprising an information reproducing system comprising: a recording medium for providing multimedia information including at least image information is recorded with optically readable codes, therein; reading means for reading code information recorded in said recording medium; processing means for processing the code information read by said reading means; and outputting means for outputting image data based on the code information processed by said processing means, said outputting means being created an output image at a predetermined position between eyeballs of an observer and said recording medium.

With this structure, the operator can therefore simultaneously see two media (the paper surface and the electronic image) without shifting the line of sight, and would feel less fatigue. Further, the two media (the paper surface and the electronic image) can be treated as an integrated medium to ensure information presentation in various forms.

(2) In the information reproducing system recited in the paragraph (1), said output means comprises a head mounted display having: an image display element for displaying the image data; a projection optical system for projecting an image, displayed on said image display element, onto eyeballs of an observer; and superimposing means for superimposing an outer image to be led to said eyeballs of said observer and said output image in an observable form.

With this structure, an electronic image is presented by an FMD or HMD and the medium surface and the code reproduced image are displayed in the same direction of the line of sight as viewed from an operator.

The operator can therefore simultaneously see two media (the paper surface and the electronic image) without shifting the line of sight, and would feel less fatigue. Further, the two media (the paper surface and the electronic image) can be treated as an integrated medium to ensure information presentation in various forms. Furthermore, the system can be made compact. Even if there are several sheets of paper, the operator can associate them with an electronic image simply by directing the sight toward the desired sheet.

(3) In the information reproducing system recited in paragraph (1), the predetermined position approximately equals a surface of the recording medium.

With this structure, an electronic image can be seen at the position matching with the medium surface.

This provides such an effect on the operator as if two media (the paper surface and the electronic image) are integrated; for example, an image is displayed on the medium surface.

(4) In the information reproducing system as recited in paragraph (2), the recording medium further has a positioning index for determining a creating position of an imaginary image of an image to be projected on the eyeballs of the observer by the projection optical system; and the information reproducing system further comprises mark output control means for producing a positioning mark to be associated with the positioning index and controlling outputting of the positioning mark in such a way that the image display element displays the positioning mark in order to position the imaginary image by the head mounted display to the real image or a predetermined position on the surface of the recording medium.

With this structure, a positioning index is provided for positioning on the medium surface, and a mark for associating an electronic image with the medium surface is displayed as separate from the image.

Therefore, the associated position of the image display position on the medium surface is determined, and two media (the paper surface and the electronic image) can be handled as an integrated medium. Further, information can be presented in various forms.

(5) In the information reproducing system as recited in paragraph (4), the positioning mark is coded and is recorded together with the codes on the recording medium.

With this structure, mark information is recorded as a code on a medium, so that this structure can cope with many kinds of media without any problem, unlike in the case where mark information is not recorded on the medium, requiring data processing by display software.

(6) The information reproducing system as recited in any one of paragraphs (1) to (5) further comprises emission means, provided in the reading means, for emitting infrared rays or a radio wave; direction detecting means, provided in the output means, for detecting a direction of emission of the infrared rays or radio wave; sight line computing means for detecting a direction of the output means from an output of the direction detecting means; display coordinate computing means for computing an image display position from display position information on a position of an imaginary image formed by the head mounted display on the surface of the recording medium and a result of computation by the sight line computing means; and image display control means for controlling an image display in accordance with the image display position.

In this structure, the reading section is provided with the source for emitting infrared rays or an electric wave, and the direction of the line of sight can be determined by detecting the position of the source by the position detecting element provided in the FMD. Further, this position is equivalent to the position of the code so that an image can be displayed at a predetermined position from the line of sight. It is therefore unnecessary for the operator to position the index on the medium to the mark on the FMD.

(7) An information reproducing system comprising reading means for optically reading optically readable codes from a recording medium including a portion where multimedia information including at least image information is recorded in optically readable codes, a real image associated with the codes being freely recordable on the recording medium; processing means for processing the codes read by the reading means and outputting predetermined data; output means for outputting the data processed by the processing means as original multimedia information; and image synthesizing means for optically synthesizing a display image output by the output means and an image on a surface of the recording medium.

This structure optically combines the output image (real image) and the image on the medium. Thus, an ordinary half mirror or the like can be used, contributing to cost reduction.

(8) An information recording medium including a portion where multimedia information including at least image information is recorded in optically readable codes, a real image associated with the codes being freely recordable on the recording medium, which recording medium has a positioning index for optically synthesizing a display image based on the image information and the real image or a predetermined position on the recording medium.

According to this structure, an index for position the coded image to the predetermined position on the medium surface (or the real image) is recorded on the medium side. If indices are on the medium, therefore, multiple positioning on one page becomes possible.

(9) The information recording medium as recited in paragraph (8), the codes recorded on the information recording medium include a positioning mark to be associated with the positioning index for determining a display position of the display image based on the image information on the surface of the information recording medium.

In this structure, mark information associated with the index is recorded in the code recorded on the medium. This structure can therefore cope with many kinds of media without any problem, unlike in the case where mark information is not recorded on the medium, requiring data processing by display software.

(10) An information reproducing system to be adapted for a recording medium including a portion where multimedia information including at least image information is recorded in optically readable codes, a real image associated with the codes being freely recordable on the recording medium, which system comprises reading means for optically reading the codes; processing means for processing the codes read by the reading means and outputting predetermined data; and output means for outputting the data processed by the processing means as original multimedia information, the output means comprising a head mounted display having an image display element for displaying input image data, a projection optical system for projecting an image, displayed on the image display element, onto eyeballs of an observer, and superimposing means for superimposing a surface of the recording medium as an outer image to be led to the eyeballs of the observer and an image based on the read codes in an observable form, the recording medium having a positioning index for determining a position of an imaginary image of an image to be projected on the eyeballs of the observer by the projection optical system, the codes including a positioning mark to be associated with the positioning index.

According to this structure, an electronic image is presented by an FMD or HMD and the medium surface and the code reproduced image are displayed in the same direction of the line of sight as viewed from an operator.

The operator can therefore simultaneously see two media (the paper surface and the electronic image) without shifting the line of sight, and would feel less fatigue. Further, the two media (the paper surface and the electronic image) can be treated as an integrated medium to ensure information presentation in various forms. Furthermore, the system can be made compact. Even if there are several sheets of paper, the operator can associate them with an electronic image simply by directing the sight toward the desired sheet.

As described in detail above, the present invention can provide an information reproducing system which can minimize the shifting of the line of sight of an operator and accomplish the proper association of the medium surface and the display screen with each other to ensure data presentation with standardized media.

Additional embodiments of the present invention will be apparent to those skilled in the art from consideration of the specification and practice of the present invention disclosed herein. It is intended that the specification and examples be considered as exemplary only, with the true scope of this invention being indicated by the following claims.

What is claimed is:

1. An information reproducing system, comprising:

reading means for optically reading an optically readable information code from a recording medium by manual scanning, said optically readable code representing multimedia information including at least image information, and said recording medium including respective regions in which the optically readable information code and a related image associated with the image information are recorded, said related image having at least one of a meaning and a content which is directly recognizable by sight;

processing means for processing the optically readable information code read by said reading means to produce processed data; and outputting means for outputting the processed data produced by said processing means as multimedia information, said outputting means including image displaying means for displaying a display image corresponding to the processed data at a predetermined position between an observer's eyeballs and said recording medium, and said recording medium having a positioning index which is used for determining a display position at which the display image is to be displayed on a surface of the recording medium by the image displaying means, wherein the image displaying means outputs and displays, while the related image and the optically readable information code recorded on said recording medium are guided onto the eyeballs of the observer, the display image in a same field of view as the related image and the optically readable information code when said reading means is operated to manually scan the optically readable information code, and said image displaying means also displays a positioning mark to be matched with the positioning index so as to determine the display position at which the display image is to be displayed on the recording medium.

2. The information reproducing apparatus according to claim 1, wherein said image displaying means comprises a head mounted display including:

an image display element for receiving the processed data produced by said processing means and for displaying the display image based on the processed data;

a projection optical system for projecting the display image displayed by said image display element onto the eyeballs of the observer; and superimposing means for enabling the related image to be displayed as an outer image with respect to the display image such that the related image, the optically readable information code and the display image are all enabled to be simultaneously observed in the same field of view.

3. The information reproducing apparatus according to claim 2, further comprising:

emission means, provided in said reading means, for emitting one of an infrared ray and a radio wave;

direction detecting means, provided in said head mounted display, for detecting a direction of emission of said one of the infrared ray and the radio wave;

sight line computing means for computing a direction of said head mounted display based on an output of said direction detecting means;

display coordinate computing means for computing an image display position on a surface of said recording medium at which the display image displayed by said image displaying means is to be displayed based on predetermined information with respect to said head mounted display and an output of said sight line computing means; and image display control means for controlling said displaying means to display the display image in accordance with the image display position computed by said display coordinate computing means.

4. The information reproducing apparatus according to claim 1, wherein said image displaying means displays the display image based on the processed data produced by said processing means at a position which substantially coincides with a surface of said recording medium.

5. The information reproducing apparatus according to claim 1, wherein said positioning mark is coded and included in the optically readable information code.

6. The information reproducing apparatus according to claim 1, wherein the related image recorded on said recording medium comprises at least one of a drawing and letters.

* * * * *

UNITED STATES PATENT AND TRADEMARK OFFICE
CERTIFICATE OF CORRECTION

| | |
|---|---|
| PATENT NO. | : 6,037,915 |
| DATED | : March 14, 2000 |
| INVENTOR(S) | : Akira Matsueda et al. |

It is certified that error appears in the above-identified patent and that said Letters Patent is hereby corrected as shown below:

On the Title Page

<u>Item [54] ABSTRACT</u>:
Line 7, change ", a" to --, and a --'
Line 10, change "section is provided" to
--section,--.

Signed and Sealed this

Nineteenth Day of June, 2001

Attest:

*Nicholas P. Godici*

NICHOLAS P. GODICI
*Attesting Officer*   *Acting Director of the United States Patent and Trademark Office*